United States Patent
Higuchi et al.

(10) Patent No.: US 7,990,633 B2
(45) Date of Patent: Aug. 2, 2011

(54) LENS DRIVING APPARATUS

(75) Inventors: Daisuke Higuchi, Nagano (JP); Yuichi Takei, Nagano (JP); Takeshi Sue, Nagano (JP)

(73) Assignee: Nidec Sankyo Corporation (JP)

( * ) Notice: Subject to any disclaimer, the term of this patent is extended or adjusted under 35 U.S.C. 154(b) by 84 days.

(21) Appl. No.: 12/415,230

(22) Filed: Mar. 31, 2009

(65) Prior Publication Data
US 2009/0251808 A1    Oct. 8, 2009

(30) Foreign Application Priority Data

Mar. 31, 2008 (JP) .................. 2008-090429
Feb. 6, 2009 (JP) .................. 2009-026706

(51) Int. Cl.
*G02B 7/02* (2006.01)
(52) U.S. Cl. ......... 359/823; 359/694; 359/822; 359/824
(58) Field of Classification Search .................. 359/823
See application file for complete search history.

(56) References Cited

U.S. PATENT DOCUMENTS

| 7,589,922 B2 * | 9/2009 | Higuchi | 359/824 |
| 2008/0247063 A1 * | 10/2008 | Otsuki et al. | 359/824 |
| 2008/0297899 A1 * | 12/2008 | Osaka et al. | 359/507 |

FOREIGN PATENT DOCUMENTS

JP          2006-259032 A    9/2006

* cited by examiner

*Primary Examiner* — Jessica T Stultz
(74) *Attorney, Agent, or Firm* — Cantor Colburn LLP

(57) ABSTRACT

In the lens driving apparatus having a sleeve, a support body (such as a yoke) that supports the sleeve via a spring member), coils attached to the sleeve, and magnets attached to the support body, the support body is provided with a yoke and a cover portion, the yoke being formed with a light-entrance window for collecting light reflected from a subject and the cover portion being attached to the inside of the light-entrance window; the cover portion, the spring member, and the magnets are arranged so that they are layered in this order from the light-entrance window, and the cover portion is formed of a non-magnetic material.

7 Claims, 9 Drawing Sheets ced adjacently to each other in the optical axis direction; a position-regulating member is provided for regulating the movable distance of the moving body in the optical axis direction; and the movable-distance of the moving body regulated by the position-regulating member is equal to or shorter than the distance in the optical axis direction measured from the end portion of the second coil on the photographic subject side to the magnetization division line or dividing line of the magnet.

According to at least an embodiment the present invention, a position-regulating member is provided for regulating the movable distance of the moving body in the optical axis direction, and the movable distance of the moving body in the optical axis direction regulated by the position-regulating member is equal to or less than the distance in the optical axis direction measured from the end portion of the second coil on the photographic subject side to the magnetization division-dividing line of the magnet; therefore, when the moving body is moved toward a photographic subject, the second coil will not overlap with the magnets on the photographic subject side, out of the magnets arranged adjacently with each other in the optical axis direction, preventing thrust force in the reverse direction. Therefore, linearity of the moving body within the driven range can be improved.

(3) Also, an embodiment of the present invention may also include the lens driving apparatus wherein the position-regulating member is the cover portion or the yoke.
LENS DRIVING APPARATUS The present invention claims priority under 35 U.S.C. §119 to Japanese Application. No. 2008-090429 filed Mar. 31, 2008, and Japanese Application No. 2009-026706 filed Feb. 6, 2009, both of which are incorporated herein by reference.

TECHNICAL FIELD

The present invention relates to a lens driving apparatus that drives a lens to be displaced in the optical axis direction in order to focus an image of a subject.

TECHNICAL BACKGROUND

In recent years, the widespread availability of camera phones having a camera function has increased the opportunities for users to photograph various kinds of photographic subjects. For example, a photographic subject at a distance from the camera lens, such as a friend or scenery, is photographed (normal snapshot) or a photographic subject at a close distance from the camera lens, such as a bus time schedule or flower petals, is photographed (close-up photography).

For close-up photography (macro photography), the camera lens needs to be positioned slightly closer to the photographic subject that for a normal snap shot. Therefore, a photographing lens system of this kind is equipped with a drive mechanism that drives the lens to be displaced in the optical axis direction; by switching a switch, the drive mechanism is driven to move the lens in the optical axis direction (see Japanese Patent Application 2006-259032 Unexamined Publication, for example).

The lens driving apparatus disclosed in Japanese Patent Application 2006-259032 Unexamined Publication comprises a holder, a yoke that supports the holder to be displaced in the optical axis direction and a pair of flat springs that sandwich the holder in the top-bottom direction. In such a configuration, while current is applied to the coils to generate electromagnetic force, the flat springs are used to generate a recovery force that opposes the electromagnetic force; by adjusting the relative strength of these two forces, the position of the holder is regulated.

The above-mentioned yoke is a magnetic body so that it can function as part of a magnetic circuit. To increase magnetic efficiency even more, a ceiling portion of the lens driving apparatus, the front end face of the apparatus opposite from the imaging device, is also a magnetic body.

However, with the above-described configuration, when the holder is moved in the optical axis direction (when the holder is moved orthogonally with respect to the above-mentioned ceiling portion), the moving distance of the sleeve when current is applied to the coils may be inconsistent.

At least an embodiment of the present invention is devised considering the above problem, and it provides a lens driving apparatus capable of preventing inconsistent moving distance of the sleeve when current is applied to the coils.

SUMMARY

Thus, at least an embodiment of the present invention may provide the following.

(1) A lens driving apparatus for driving a lens to be displaced in the optical axis direction to focus on an image of a subject to be photographed, comprising a moving body holding a lens and movable in the optical axis direction, a support body supporting the moving body via spring members, coils attached to the moving body, and magnets attached the support body; wherein the support body is provided with a yoke and a cover portion, the yoke having a light-entrance window for collecting light reflected from a photographic subject and the cover portion being attached to the inside of the light-entrance window; and the cover portion, the spring members, and the magnets are arranged so that they are layered in this order from the light-entrance window, and the cover portion is formed of a non-magnetic material.

According to at least an embodiment of the present invention, in the lens driving apparatus in which the moving body, the support body, the coils, and the magnets are provided, the yoke in which the light-entrance window is created, and the cover portion attached to the inside of the light-entrance window are provided as the support body. The cover portion, the spring member and the magnets are arranged so that they are layered in this order from the light-entrance window, and the cover portion is formed of a non-magnetic member; therefore, magnetic flux coming from the magnet will not flow toward the cover portion, thus making the magnetic flux interlinked with the coil constant in the moving range of the sleeve and therefore, improving linearity of the moving body within its driven range. Further, because the cover portion is provided, the moving body is kept from moving too close to the yoke (magnetic body) which is a constituent of the edge of the light-entrance window, thus preventing unstable magnetic behavioral characteristic.

The "non-magnetic material" here can be any kind of material. For example, it may be a metallic material with no or little magnetic properties, or may be a resin material with no or little magnetic properties.

(2) Also, at least an embodiment may include the lens driving apparatus wherein the magnet is magnetized to different poles on the inside face and the outside face in the radial direction and the portions magnetized to two different poles are arranged adjacently to each other in the optical axis direction; the coils are arranged such that the winding direction of the first coil on the photographic subject side is a reverse of that of the second coil on the imaging device side and both coils are opposed to the magnet in the radial direction and arranged to be adja According to at least an embodiment of the present invention, the position-regulating member is the cover portion or the yoke; therefore, the moving body is prevented from moving too close to the cover portion or the yoke, which in turn prevents unstable magnetic behavioral characteristics.

(4) Also, at least an embodiment may include the lens driving apparatus wherein a magnetic member is attached to the end face of the moving body on the photographic subject side and arranged between the cover portion and a drive portion configured by the coil and the magnets.

According to at least an embodiment of the present invention, a magnetic member may be attached to the end face of the above-mentioned moving body on the photographic subject side, and the magnetic member may be arranged closer to the light-entrance window than the drive portion; therefore, the moving body is magnetically attracted toward the imaging device by the magnetic member to prevent the moving body from wobbling when the moving body is in still mode (for macro photography).

(5) Also, at least an embodiment may include the lens driving apparatus wherein a magnetic member is attached to the end face of the moving body on the photographic subject side, and the magnetic member is annular.

According to at least an embodiment of the present invention, the magnetic member attached to the end face of the moving body on the photographic subject side magnetically attracts the moving body toward the imaging device to prevent the moving body from wobbling when the moving body is in still mode (for macro photography). Also, since the magnetic member is annular, it can generate attraction force evenly over the entire circumference, thus preventing the inclination of the moving body.

(6) Also, at least an embodiment may include the lens driving apparatus wherein the yoke is configured by a ceiling portion in which the light-entrance window is created and a back yoke portion that surrounds the outside circumference of the moving body, and the ceiling portion and the back yoke portion are connected to each other orthogonally.

According to at least an embodiment of the present invention, the above-described yoke is configured by a ceiling portion in which the light-entrance window is created and a back yoke portion that surrounds the outside circumference of the moving body, and the ceiling portion and the back yoke portion are connected to each other orthogonally; therefore, leakage magnetic flux from the magnetic path can be reduced, improving linearity of the moving body. In other words, when a yoke having an L-shaped cross-section is used, it easily causes unstable magnetic flux; in the present invention, however, since the cover portion is formed of a non-magnetic material, magnetic flux coming from the magnets will not flow toward the cover portion and the magnetic flux interlinked with coil becomes constant within the moving range of the sleeve, contributing to improvement of linearity. Compared to a yoke having a substantially-U-shaped cross-section (the yoke having an inner yoke), this L-shaped yoke has no inner yoke, thus preventing the need to expand the apparatus in the radial direction and contributing to downsizing the apparatus.

The "ceiling portion" and the "back yoke portion" can be formed of any material. For example, they may be formed of different materials or the same material. When the same material is used, both members are constructed integrally; consequently, the number of components can be reduced.

(7) Also, at least an embodiment may include the lens driving apparatus wherein the cover portion is positioned in the optical axis direction by using the ceiling portion and positioned in the direction orthogonal to the optical axis direction by using the back yoke portion.

According to at least an embodiment of the present invention, the above-described cover portion is positioned in the optical axis direction by using the ceiling portion and positioned in the direction orthogonal to the optical axis direction by using the back yoke portion; therefore, operability in assembling the lens driving apparatus can be increased. Also, the cover portion is positioned by the ceiling portion so that the cover portion can be used as a stopper.

According to the lens driving apparatus of at least an embodiment of the present invention, a cover portion formed of a non-magnetic material is provided; therefore, magnetic flux from magnets is prevented from flowing to the cover portion, which in turn prevents unstable magnetic behavioral characteristics. Also, since a position-regulating member is provided for regulating the movable distance of a moving body in the optical axis direction, linearity of the moving body can be improved.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

[Mechanical Configuration]

Figure 1:
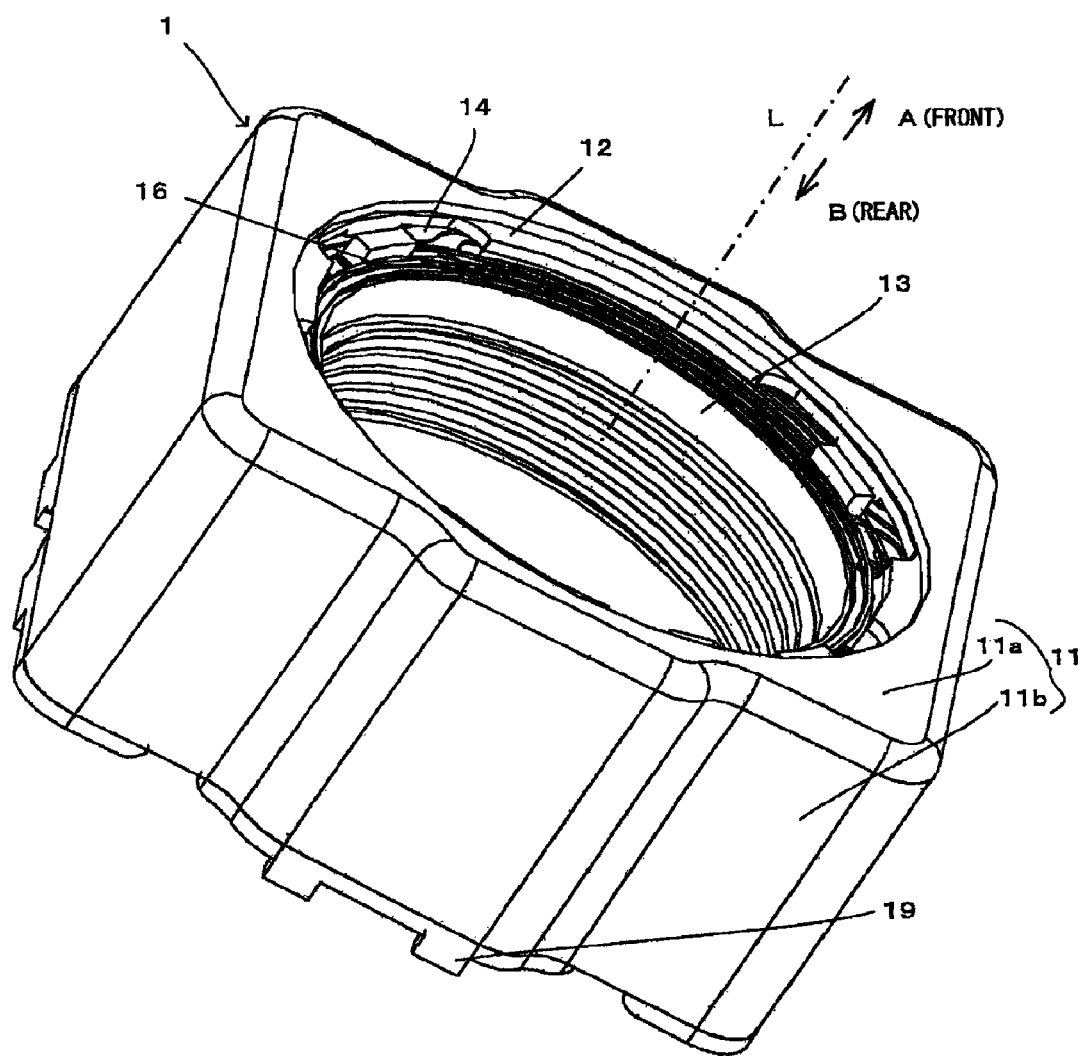
FIG. 1 is a perspective view of the external configuration of the lens driving apparatus of an embodiment of the present invention.
Figure 2:
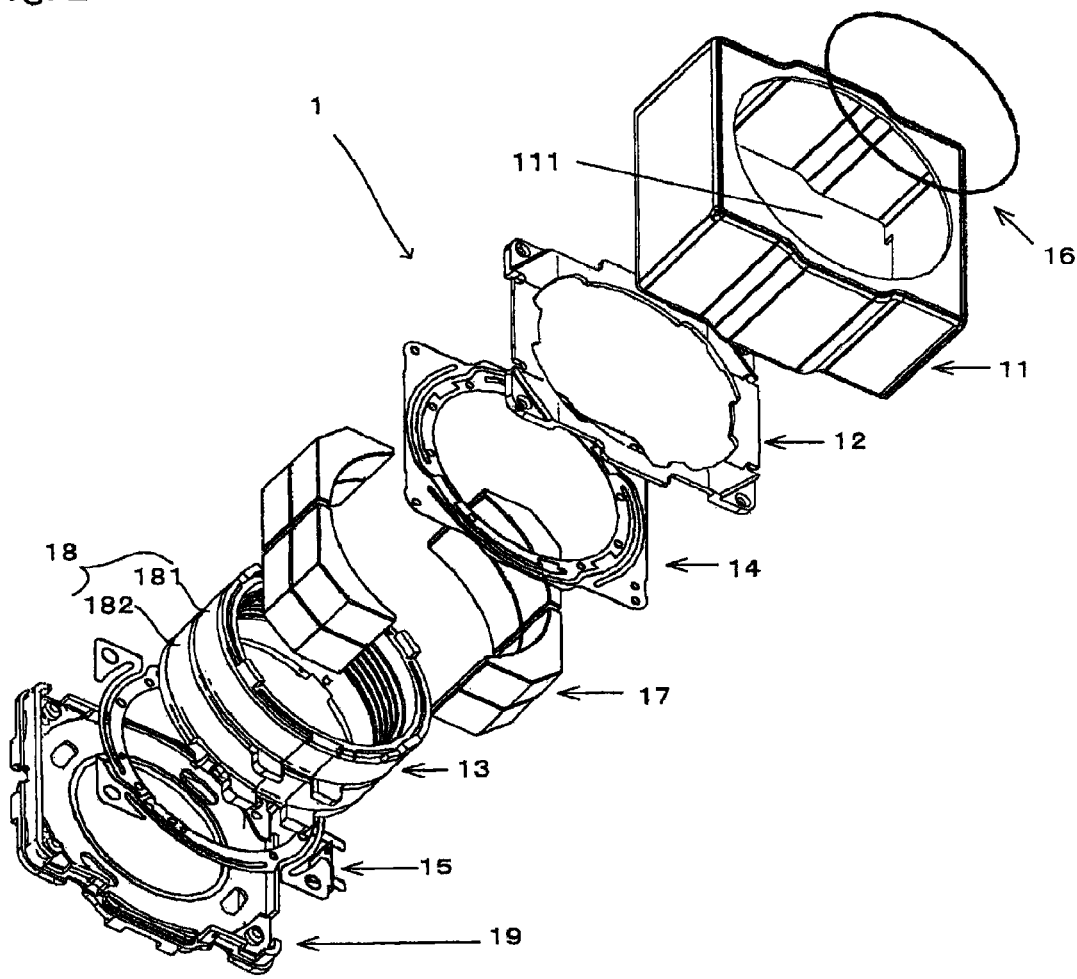
FIG. 2 is an exploded perspective view of the mechanical configuration of the lens driving apparatus of the embodiment of the present invention.
Figure 3:
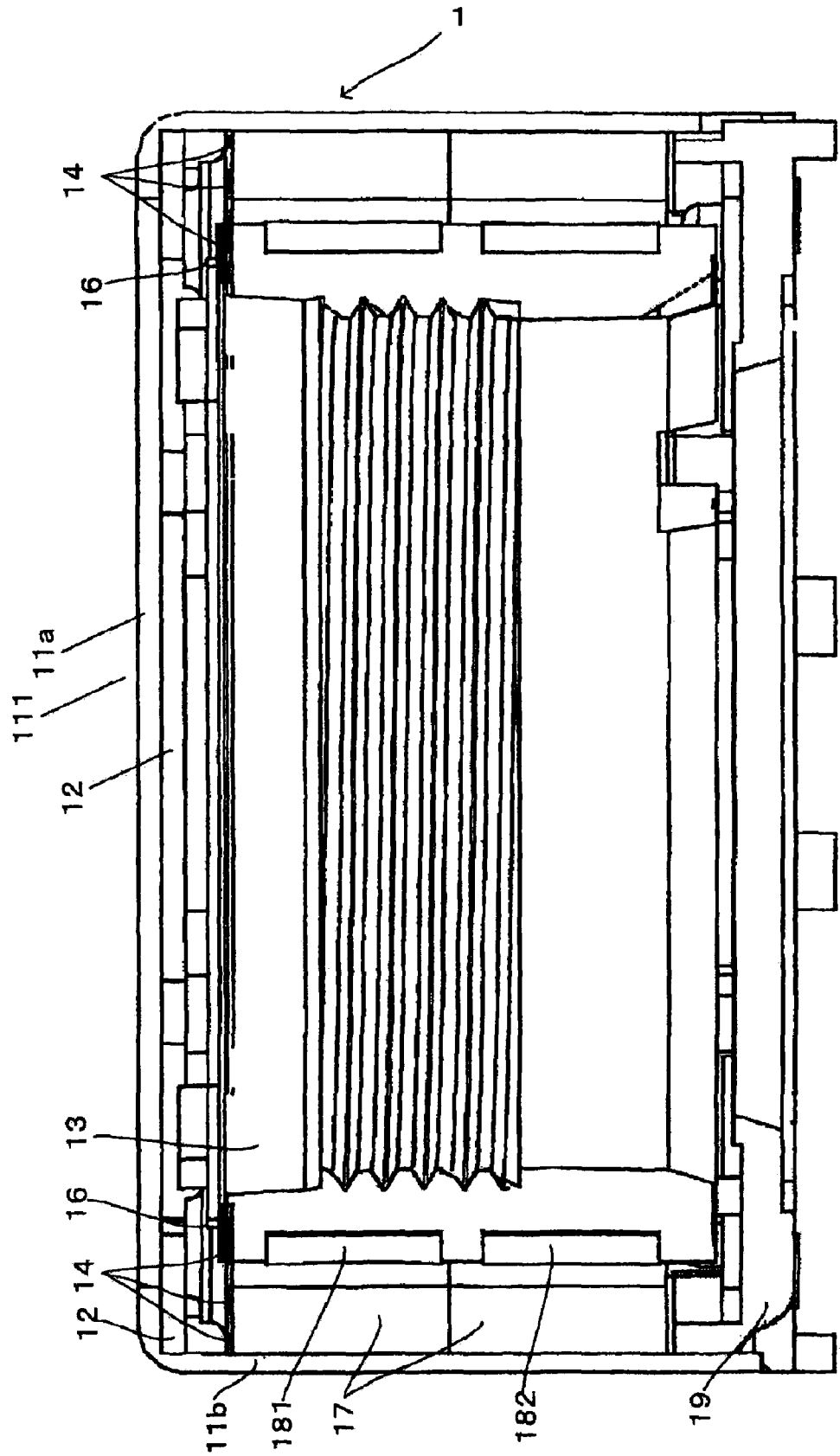
FIG. 3 is a cross-sectional view of the lens driving apparatus 1 taken along the direction of the optical axis, L, of the lens.

FIG. 1 is a perspective view of the external configuration of a lens driving apparatus 1 of at least an embodiment of the present invention. FIG. 2 is an exploded perspective view of the mechanical configuration of the lens driving apparatus 1 of at least an embodiment of the present invention. FIG. 3 is a cross-sectional view of the lens driving apparatus 1 taken along the direction of the optical axis, L, of the lens.

In FIG. 1 through FIG. 3, the lens driving apparatus 1 comprises a yoke 11, a cover portion 12, a sleeve 13, a first flat spring 14, a second flat spring 15, a wire spring 16, a magnet 17, a coil 18 (first coil 181 and second coil 182) and a holder 19; it drives a lens to be displaced in the direction of the optical axis, L, to focus on an image of a subject to be photographed.

Note that the illustration of a lens barrel, into which the lens is installed, is omitted. Along the direction of the optical axis, L, the lens driving apparatus 1 moves the sleeve 13 in both A direction (toward the front) to get closer to a photographic subject and B direction (toward an image) which is away from a photographic subject (see FIG. 1). The sleeve 13 holding the lens barrel (no illustration as mentioned above), into which a single or multiple lens(es) are installed, is configured movable in the direction of the optical axis, L, together with the wire spring 16, etc., and is a "moving body". Also, the yoke 11, the cover portion 12 and the holder 19 are the "support body" which supports the sleeve 13, etc. to move in the direction the optical axis, L, via the first flat spring 14 and the second flat spring 15. The sleeve 13, etc. are driven in the direction of the optical axis, L, by the coil 18 attached to the "moving body" and the magnet 17 attached to the "support body". Note that the yoke 11 is an iron-based steel sheet and the wire spring 16 is composed of SUS304 steel. Also, the cover portion is composed of SUS304 steel.

The yoke 11 is exposed to the front face or side face of the lens driving apparatus 1 and has a ceiling portion 11a, in the center of which a circular light-entrance window 111 is created for collecting light reflected from a photographic subject into the lens. Also the yoke 11 has a back yoke portion 11b that surrounds the outside circumference of the sleeve 13. The ceiling portion 11a and the back yoke portion 11b are orthogonally connected to each other. In this embodiment, these are formed of the same material; therefore, they are integrally formed.

The cover portion 12 is attached to the yoke 11 on the inner side of the light-entrance window 111 created in the ceiling portion 11a. In its center, a circular window is created for collecting light reflected from a photographic subject into the lens. The holder 19 holds an imaging device (not illustrated) on the image side.

The coil 18 is configured by the first coil 181 and the second coil 182 which are arranged in two layers in the direction of the optical axis, L; both of the coils are formed annular but the winding direction is opposite from each other. Then, the coil 18 is wound around the outside circumferential face of the sleeve 13 with a predetermined distance. Also, the eight magnets 17 are arranged in two layers in the optical axis direction; the magnets 17 in each layer is configured such that the front magnets 17 are opposed to the outside circumference of the first coil 181 and the rear magnets 17 to the outside circumference of the second coil 182; as shown in FIG. 1 and the like, they are fixed to the four corners of the inside circumferential face of the yoke 11 in an almost quadrangle external shape.

In this embodiment, each magnet 17 is magnetized to different poles on the inside face and the outside face. For example, the four magnets 17 arranged on the front side are magnetized to the N pole on the inside face and the S pole on the outside face, and the four magnets 17 on the rear side are magnetized to the S pole on the inside face and the N pole on the outside face. Because of this configuration, the front magnets 17 and the first coil 181 generate thrust force toward a photographic subject, and the rear magnets and the second coil in which the winding direction is a reverse of that of the first coil also generate thrust force toward a photographic subject.

The first flat spring 14 and the second flat spring 15 are both formed of a thin metal sheet, and have the same thickness in the direction of the optical axis, L. Also, the first flat spring 14 is attached to the front end face (on the A side in FIG. 1) of the sleeve 13 in the optical axis L direction, and the second flat spring 15 is attached to the rear end face (on the B side in FIG. 1) of the sleeve 13 in the optical axis L direction. Note that the second flat spring 15, configured by two spring pieces which are electrically separated, functions as a medium for supplying current from the external power source; the beginning of winding of the coil 18 is electrically connected with one of the spring pieces and the end of winding is electrically connected with the other spring piece.

The yoke 11 is formed such that its dimension in the optical axis direction is greater than the dimension of the area in the optical axis direction in which the first coil 181 and the second coil 182 are arranged and the dimension of the magnet 17 in the optical axis direction; therefore, leakage flux from the magnetic path created between the front magnet 17 and the first coil 181 and from the magnetic path created between the rear magnet 17 and the second coil 182 can be reduced. Consequently, linearity between the moving distance of the sleeve 13 and the current applied to the first coil 181 and the second coil 182 can be improved.

The lens driving apparatus 1 is equipped with the annular wire spring 16. The wire spring 16 is a magnetic member and attached to the end face (the front end face) of the sleeve 13 on the photographic subject side. Also, the wire spring 16 applies urging force to the sleeve 13 in the optical axis L direction due to magnetic attraction force created between the spring and the magnet 17. Therefore, the moving body (sleeve 13, etc.) is prevented from being displaced by its own weight when current is not applied to the coils, and therefore, the moving body (sleeve 13, etc.) can be kept in a desired position. Thus, resistance to shock is improved.

Figure 9:
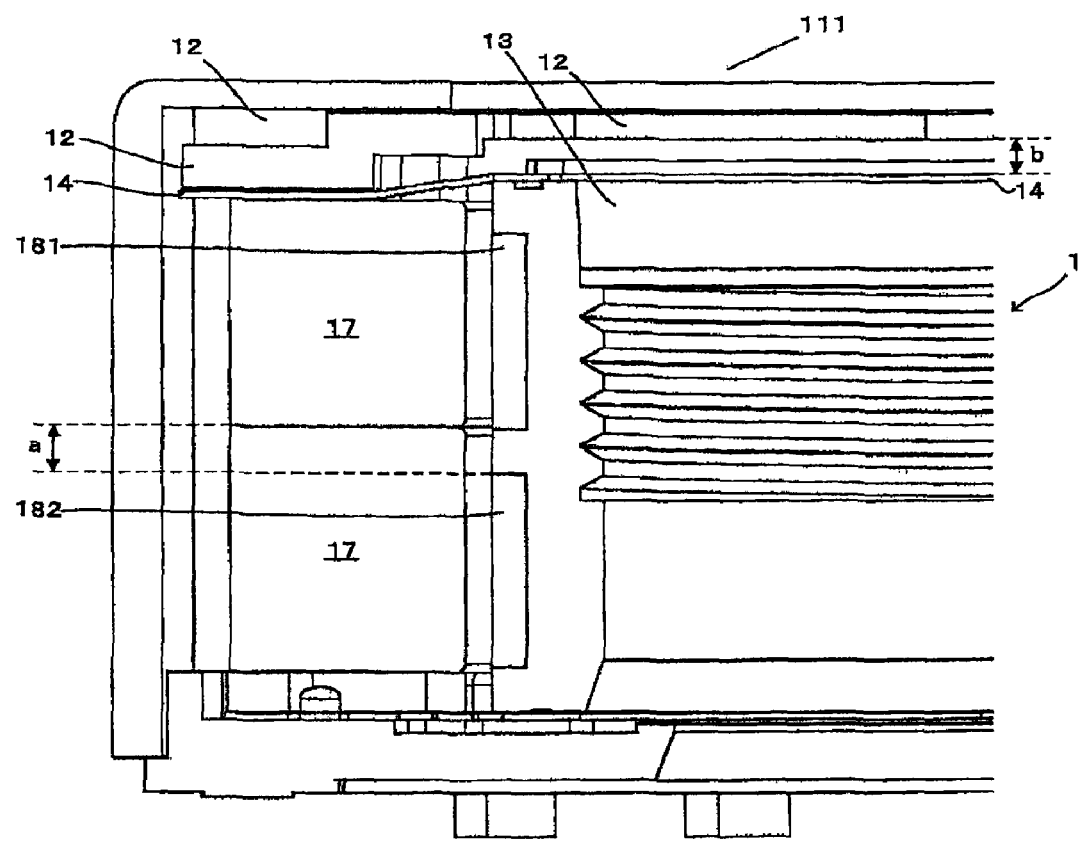
FIG. 9 is a side cross-sectional view of the lens driving apparatus.

The lens driving apparatus 1 of this embodiment is featured by the structure of the above-described cover portion 12 and its positional relationship with other components. More specifically described, the cover portion 12 is capable of regulating the movable distance of the moving body in the optical axis direction and also is formed of a non-magnetic material. The cover portion 12, the first flat spring 14 and the magnet 17 are layered in this order from the light-entrance window 11 (on the A side in FIG. 1) (see FIG. 3). Therefore, the sleeve 13 is prevented from getting too close to a magnetic body such as the ceiling portion 11a. When the cover portion 12 is a magnetic body, some of the magnetic flux leaks toward the cover portion 12 from the side portion of the magnets 17 on the photographic subject side, thus reducing magnetic flux that interlinks with the coils. Since the magnet inside face on the photographic subject side is not opposed to the coil when the sleeve 13 is in the movement-starting position, the decrease in magnetic flux does not affect much; however, when the sleeve 13 is moved toward the photographic subject, the magnetic flux interlinked with the coil decreases because the magnetic flux that should originally be interlinked to the coil has been flowing toward the cover portion 12, thus reducing thrust force. For this reason, linearity between the moving distance of the sleeve 13 and the current applied to the coils may deteriorate. On the other hand, when the cover portion 12 is a non-magnetic body, none of the magnetic flux leaks toward the cover portion 12 from the end portion of the magnet 17 on the photographic subject side; therefore, the magnetic flux interlinked with the coil is generally constant within the moving range of the sleeve 13. Also, when the moving body is in a position prior to moving, that is in an original position at which the moving body is urged by the flat spring 14 and the flat spring 1S toward an image (to the rear side), the distance, b, is equal to or less than the distance, a (a≧b, see FIG. 9) where b is measured from the part of the moving body that makes contact with the cover portion to the position at which the movable distance of the sleeve 13 in the optical axis direction can be regulated, and a is measured from the end portion of the second coil on the photographic subject side to the magnetization division or dividing line of the magnet in the optical axis direction. Therefore, even when the moving body is moved toward the photographic subject, the second coil will not overlap with the magnets arranged on the photographic subject side, out of the magnets which are arranged adjacently in the optical axis direction. This prevents the generation of Trust force in the reverse direction. Thus, linearity can be improved.

Since the above-described wire spring 16 is arranged closer to the light-entrance window 111 than the first flat spring 14 is (see FIG. 3), the wire spring 16 can relax the first flat spring 14 with more certainty by using the magnetic attraction force created with the magnet 17 and urge the first flat spring 14 in the optical axis L direction.

[Assembling Process]

Figure 5:
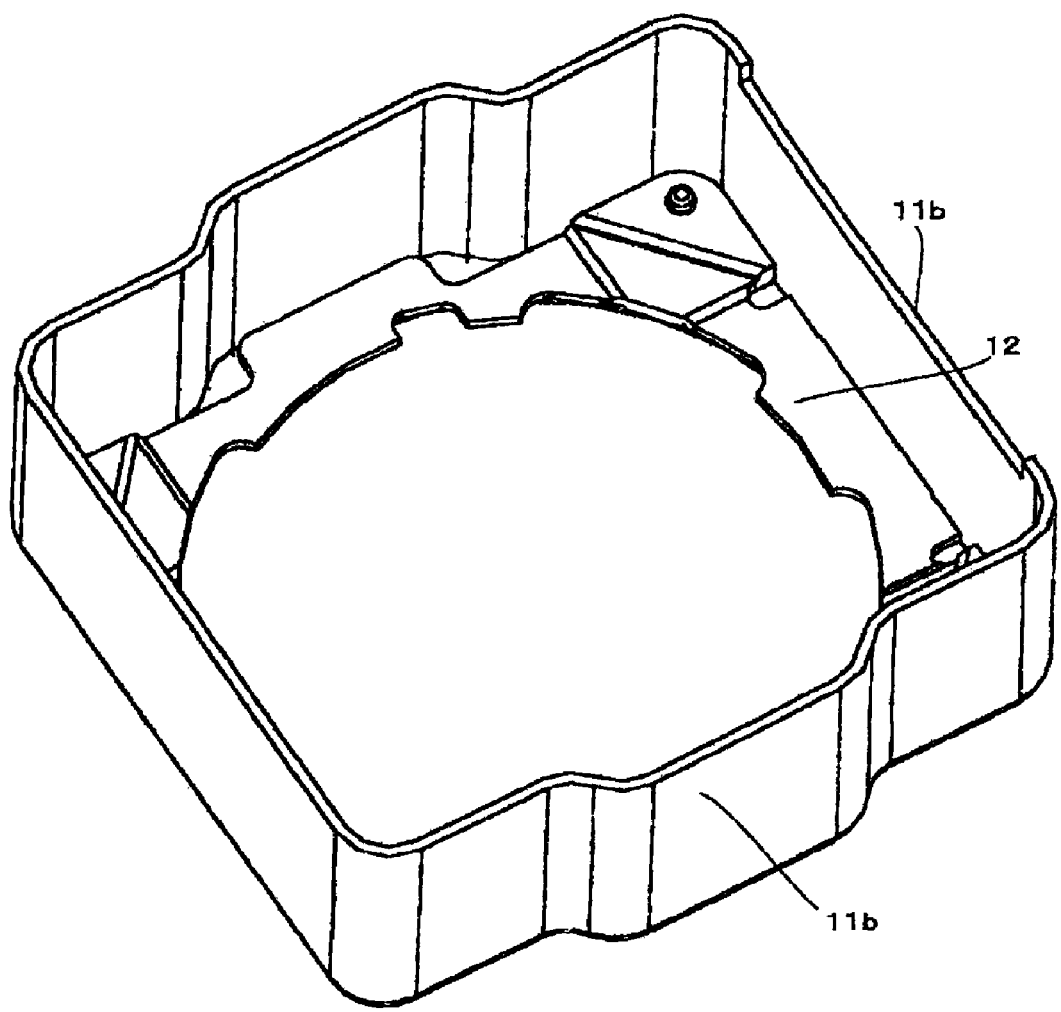
FIG. 5 is a perspective view of the yoke in which the cover portion is placed.
Figure 6:
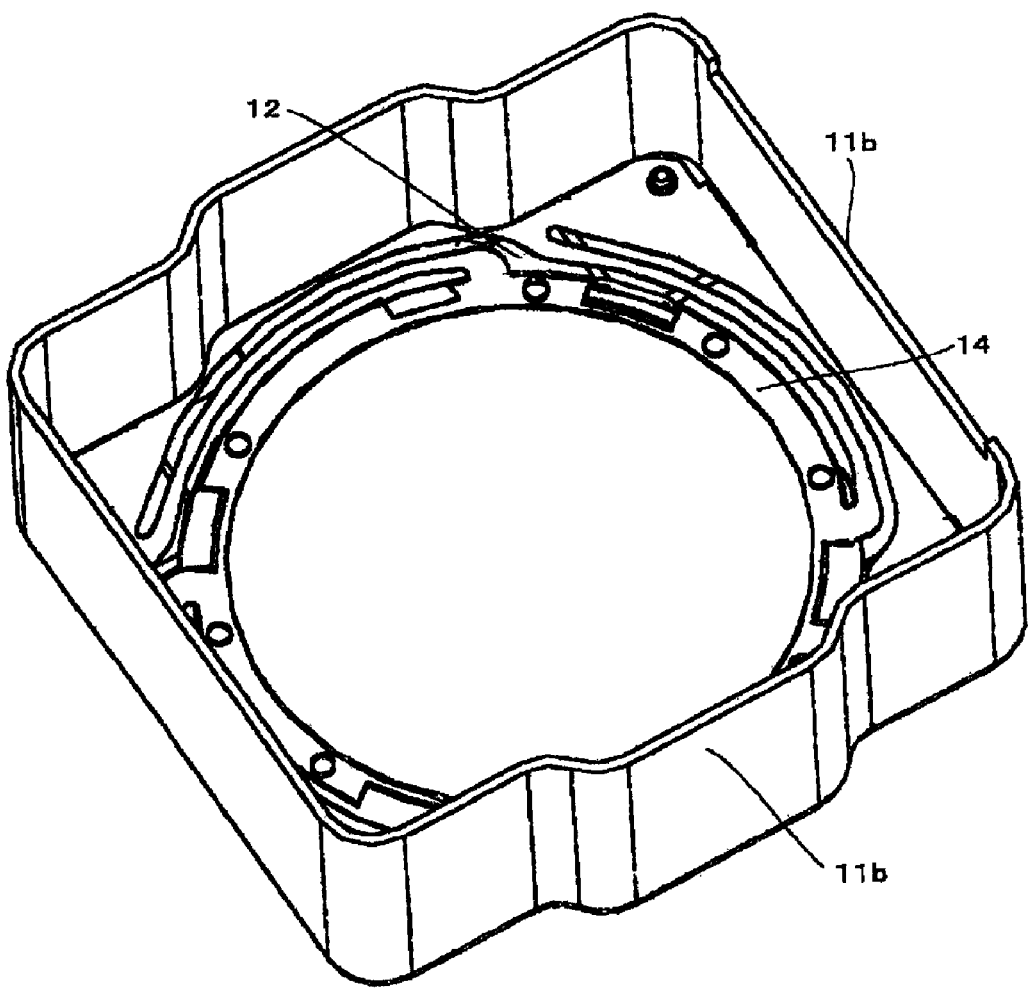
FIG. 6 is a perspective view of the yoke in which the cover portion and the first flat spring are placed.
Figure 7:
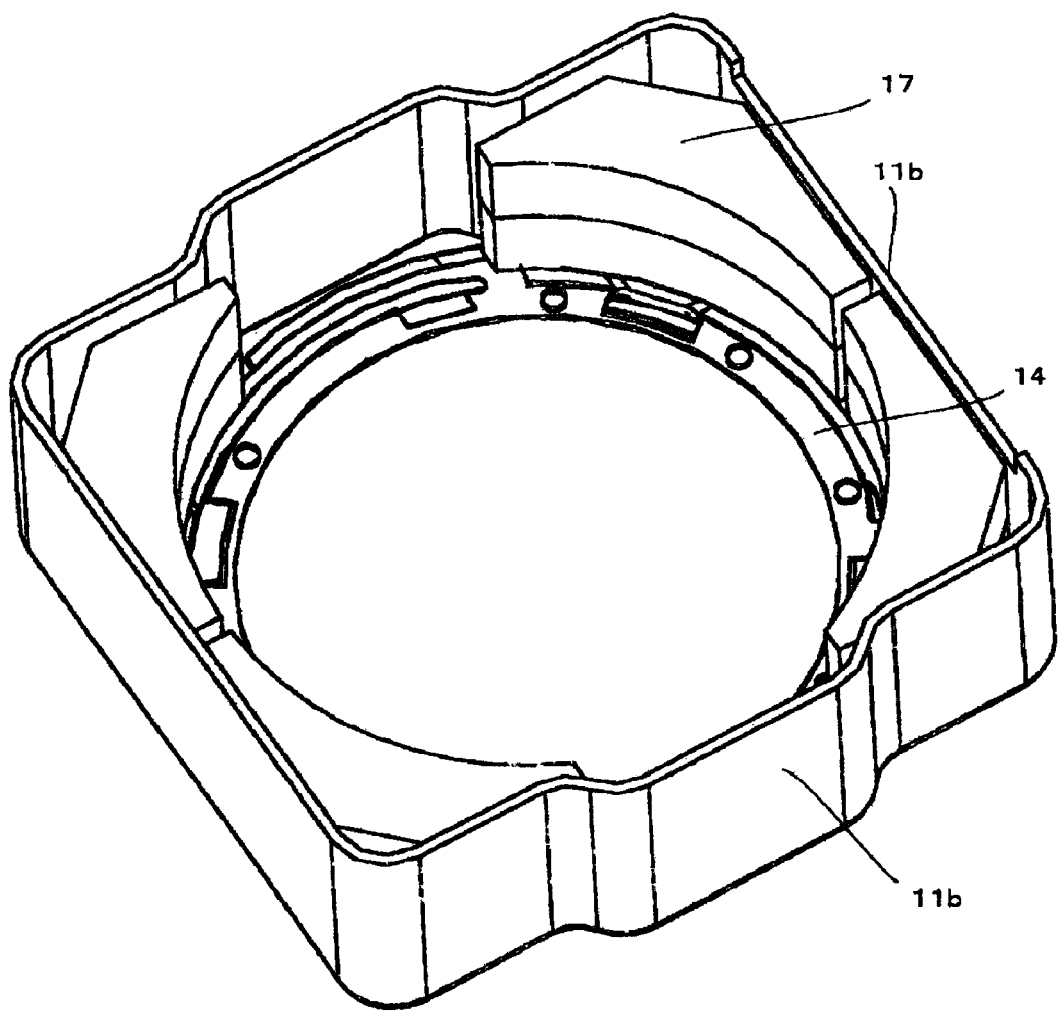
FIG. 7 is a perspective view of the yoke in which the cover portion and the first flat spring are placed and then the magnet is attached.

The order of assembling the lens driving apparatus 1 will be described. In particular, FIG. 4 through FIG. 7 are used to describe how the cover portion 12, the first flat spring 14 and the magnet 17 are layered. FIG. 4 is a diagram paying attention to the yoke 11 (the ceiling portion 11a and the back yoke portion 11b) of the lens driving apparatus 1. FIG. 5 is a perspective view showing that the cover portion 12 is placed in the yoke 11. FIG. 6 is a perspective view showing that the cover portion 12 and the first flat spring 14 are placed in the yoke 11. FIG. 7 is a perspective view showing that the cover portion 12 and the first flat spring 14 are placed in the yoke 11 and then the magnet 17 is attached. Note that the lens driving apparatus 1 may be assembled mechanically or manually.

Figure 4A:
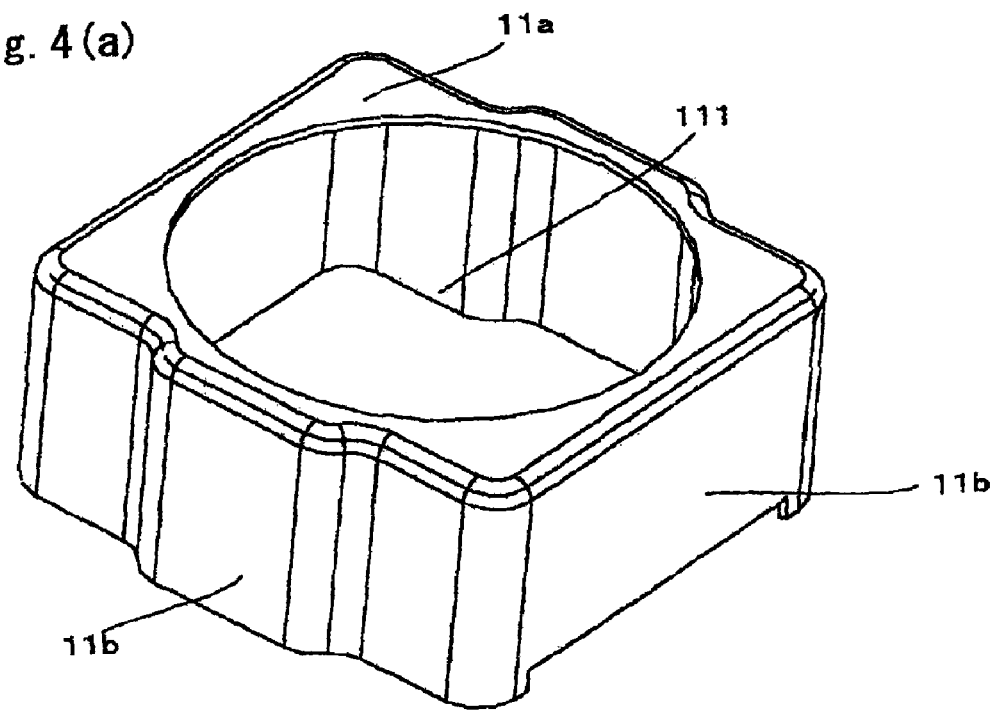
FIGS. 4(a) and 4(b) are perspective views of the yoke which is taken out from the lens driving apparatus.
Figure 4B:
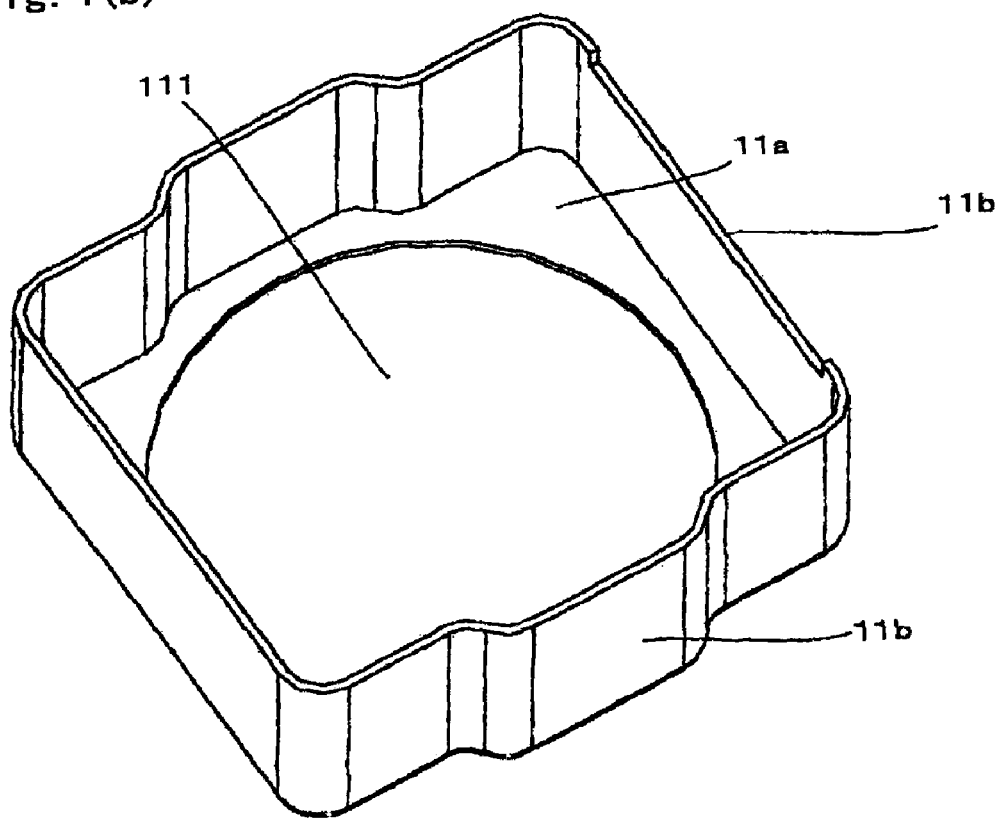

In FIGS. 4(a) and 4(b), the yoke 11 is first placed on a work table with the back side up (FIG. 4 (a)→FIG. 4 (b)). More specifically described, the yoke is placed upside down so that the ceiling portion 11a, i.e. the top face (front face) in the optical axis L direction becomes the bottom face. Next, the cover portion 12 is placed inside the yoke 11. FIG. 5 shows a more detailed illustration. At that time, an adhesive may or may not be used. Also, using the back yoke portion 11b of the yoke 11, the cover portion 12 can be positioned in the radial direction simultaneously when placed. In addition, using the ceiling portion 11a of the yoke 11, the cover portion 12 can be positioned in the optical axis direction simultaneously when placed. Then, the first flat spring 14 is attached on top of the cover portion 12 (see FIG. 6). Even at this time, the first flat spring 14 is positioned in the radial direction using the back yoke portion 11b and positioned in the optical axis direction using the cover portion 12 which is arranged parallel along the ceiling portion 11a. Note that the positioning and placement are performed simultaneously.

Next, the magnet 17 is attached on top of the first flat spring 14. FIG. 7 shows a more detailed illustration. At that time, using the back yoke portion 11b of the yoke 11, [the magnet 17] is positioned in the radial direction and attached simultaneously.

The coil 18 is wound around the sleeve 13; the second flat spring 15 is attached to the rear end face of the sleeve 13; the holder 19 is attached to the sleeve 13 sandwiching the second flat spring 15 between them; in this manner, the sleeve assembly is completed. The sleeve assembly is inserted to the yoke 11 shown in FIG. 7 from the back.

Finally, the wire spring 16 is installed inside the yoke 11 from the light-entrance window 111 of the ceiling portion 11a (from the front). For this reason, the diameter of the light-entrance window 11 is larger than that of the wire spring 16 in the lens driving apparatus 1 of this embodiment. Therefore, the wire spring 16 can be installed at the final step of the assembling process, which in turn increases freedom in operation. Also, the wire spring 16 can be easily installed through the light-entrance window 111 of the ceiling portion 11a; therefore, even when design change is urgently required (by requests from customers, for example), it can be done promptly.

[Basic Operation]

In the lens driving apparatus 1 of this embodiment, the moving body is positioned close to the imaging device (on the image side) normally (when current is not applied to the first coil 181 and the second coil 182). At that time, the wire spring 16 regulates the displacement of the moving body by the magnetic attraction force generated between [the wire spring and] the magnets 17. However, the distance between the wire spring 16 and the magnets 17 are maintained to some degree; therefore, the magnetic attraction force between the wire spring 16 and the magnets 17 will not be excessively strong. Because of this, the center axis of the moving body is kept from shifting, preventing deterioration of the tilt property.

Under such a condition, when current is applied to the first coil 181 and the second coil 182, the upward electromagnetic force (toward the front) is exerted to the first coil 181 and the second coil 182 respectively. Because of this, the first coil 181, the second coil 182 and the sleeve 13 start moving toward the photographic subject (toward the front).

At that time, between the first flat spring 14 and the front end of the sleeve 13 and between the second flat spring 15 and the rear end of the sleeve 13, resilient force is generated to regulate the movement of the sleeve 13. For this reason, when the electromagnetic force that moves the sleeve 13 toward the front and the resilient force that regulates the movement of the sleeve 13 attain equilibrium, the sleeve 13 stops. Also, when current in the reverse direction is applied to the first coil 181 and the second coil 182, the downward electromagnetic force (toward the back) is applied to the first coil 181 and the second coil 182.

By adjusting the amount of current applied to the first coil 181 and the second coil 182 and by adjusting the resilient force exerted on the sleeve 13 by the first flat spring 14 and the second flat spring 15, the sleeve 13 (moving body) can be stopped in a desired position. Note that, unlike the configuration in which the components make contact with each other so as to be engaged with a stopper portion, etc., the sleeve 13 is stopped by using equilibrium between the electromagnetic force and the resilient force, preventing collision noise.

Major Effects of Embodiment

According to the lens driving apparatus 1 of this embodiment, the cover portion 12 formed of a non-magnetic material is used to regulate the movable distance of the moving body in the optical axis direction; when the moving body is moved toward a photographic subject, the second coil will not overlap with the magnet on the photographic subject side, out of the magnets arranged adjacently in the optical axis direction. Therefore, while thrust in the reverse direction is prevented from being generated (a stopper function is being demonstrated), the magnetic flux from the magnets will not flow toward the cover portion, which makes the magnetic flux interlinked with the coil be constant within the moving range of the sleeve. Consequently, linearity of the sleeve 13 in the driven range can be improved.

Also, since the cover portion 12 is sandwiched between the ceiling portion 11a of the yoke 11 and the first flat spring 14 (magnet 17) (see FIG. 5 through FIG. 7), efficiency in operation can be improved.

By using a non-magnetic material such as resin, which is inexpensive and easily processed, for the material of the cover portion 12, manufacturing cost can be reduced and complex shape can also be realized.

Further, because the wire spring 16 is kept away from the magnet 17 by interposing the first flat spring 14 between them, the sleeve 13 is kept from wobbling in still mode, and unstable magnetic flux is prevented.

Furthermore, in this embodiment, the ceiling portion 11a and the back yoke portion 11b are connected orthogonally (as a result, magnetic flux may become unstable); however, because the cover portion 12 formed of a non-magnetic material is provided, magnetic flux coming from the magnet will not flow to the cover portion and therefore, the magnetic flux interlinked with the coil can be kept constant within the moving range of the sleeve. In addition, since the yoke 11 does not have an inner yoke, the expansion of the apparatus in the radial direction can be prevented, contributing to downsizing the apparatus.

Note that the lens driving apparatus 1 can be used not only in camera phones but also in various electronic apparatuses. Examples are PHSs, PDAs, barcode readers, thin digital cameras, monitoring cameras, rear-view cameras (for checking behind vehicles), and doors having an optical verification function.

Embodiment

Figure 8:
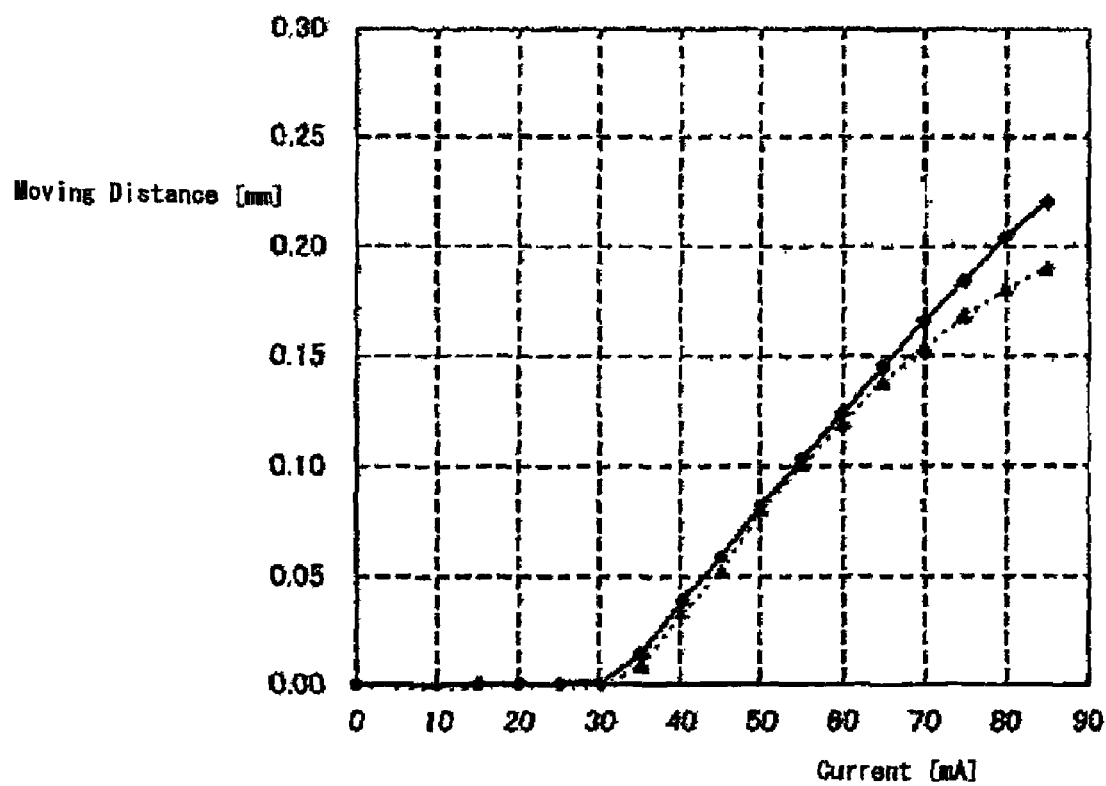
FIG. 8 is a graph showing the moving distance of the sleeve when current is applied to the coils in the lens driving apparatus of the embodiment of the present invention.

FIG. 8 is a graph showing the moving distance of the sleeve when current is applied to the coils in the lens driving apparatus of this embodiment of the present invention. Broken lines indicate that the cover portion is formed of a magnetic material, and solid lines indicate that the cover portion is formed of a non-magnetic material.

When the cover portion is formed of a magnetic material, the displacement of the moving body with respect to the input current of 70 mA or more is small, compared to that with respect to the input current of between 40 mA and 60 mA; however, when the cover portion is formed of a non-magnetic material, the displacement of the moving body with respect to the input current of around 30 mA to 70 mA shows a straight line. Therefore, it is understood that when the cover portion is formed of a non-magnetic material, the properly of the magnetic circuit is stable.

At the beginning of the movement of the moving body when the sleeve starts moving toward a photographic subject along the optical axis direction, almost identical characteristics are shown no matter which material the cover portion is formed of, a magnetic material or a non-magnetic material (up to about 30 mA); however, when the moving body has moved toward a photographic subject and remains in the upper position, the displacement is reduced by the decrease in magnetic flux even with the same amount of current if the cover portion is a magnetic body. Thus, linearity is deteriorated. Note that such a tendency happens either when the sleeve is moved toward a photographic subject along the optical axis direction or when the sleeve is moved toward the imaging device along the optical axis direction; thus, it is understood that the property of the magnetic circuit is more stable when the cover portion is formed of a non-magnetic material than of a magnetic material.

Other Embodiments

The above-described embodiment is an example of an ideal embodiment of the present invention; however, the present invention is not limited to this, but can be varyingly modified within the scope of the present invention.

In the above-described embodiment, the cover portion 12 is used as a position-regulating member; however, other members may be given the function of the position-regulating member. For example, in FIG. 3, the shape of the ceiling portion 11a of the yoke 11 may be partially changed to obtain the function of the position-regulating member. In other words, the inner circumferential edge portion of the light-entrance window 111 created in the ceiling portion 11a is bent toward the image (to the back) to be used for positioning. At that time, the inner circumferential edge portion that is bent toward the image may be bent all around or bent at one or several places.

In the above-described embodiment, the moving body in the original position is urged toward the image (to the back) by the flat springs 14 and 15; however, the original position may be determined by not relaxing the flat springs 14 and 15 or determined by relaxing either the flat spring 14 or the flat spring 15.

POSSIBILITY OF INDUSTRIAL APPLICATION

The lens driving apparatus is useful for preventing unstable magnetic behavioral characteristic.

The lens driving apparatus may be used in photography including digital photography but may also be used in any optical lens application including but limited to video, film, movies, holography, and laser applications.

DESCRIPTION OF CODES

1 Lens driving apparatus
11 Yoke
11a Ceiling portion
11b Back yoke portion
12 Cover portion
13 Moving body (sleeve)
14 First flat spring
15 Second flat spring
16 Wire spring
17 Magnet
18 Coil
19 Holder While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens driving apparatus for use with a lens and for driving the lens to be displaced in the optical axis direction to focus on an image of a subject or scene, the lens driving apparatus comprising:

a moving body for holding the lens and movable in the optical axis direction;

a support body supporting said moving body via spring members;

coils attached to said moving body;

magnets attached to said support body; and spring members comprising a first plate spring attached to the subject or scene side of said moving body in the optical axis direction and a second plate spring which is attached to the imaging device side of said moving body in the optical axis direction;

wherein said support body is provided with a yoke and a cover portion, said yoke having a light-entrance window therein for collecting light reflected from the subject or scene, and said cover portion being attached to the inside of said light-entrance window; and wherein said yoke comprises a ceiling portion in which said light-entrance window is created and a back yoke portion that surrounds an entire outside circumference of said moving body, and said ceiling portion and said back yoke portion are connected orthogonally and integrally formed; and said cover portion, said first spring member, and said magnets are structurally arranged in an order, starting at said light entrance window, of said cover portion, said first spring member, and said magnets, and said cover portion is formed of a non-magnetic material.

2. The lens driving apparatus of claim 1 wherein said magnets are magnetized to different poles on the inside face and the outside face in the radial direction and arranged such that the two different poles are adjacent to each other in the optical axis direction;

said coils are arranged such that the winding directions of a first coil on the subject side and a second coil on the imaging device side, both of which are opposed to said magnets in the radial direction, are reversed from each other and said first and second coils are arranged to be adjacent to each other in the optical axis direction;

a position-regulating member is provided for regulating the movable distance of said moving body in the optical axis direction; and the movable distance of said moving body being regulated by said position-regulating member is structurally set to be equal to or shorter than the distance in the optical axis direction measured from the end portion of said second coil on the subject side to the magnetization division or dividing line of said magnet.

3. The lens driving apparatus of claim 2, wherein said position-regulating member is said cover portion or said yoke.

4. The lens driving apparatus of claim 3, wherein attached to an end face of said moving body on the subject side is a magnetic member which is attracted by said magnets to maintain said moving body in the original position, and said magnetic member is annular.

5. The lens driving apparatus of claim 1, wherein attached to an end face of said moving body on the subject side is a magnetic member, and said magnetic member is arranged between said cover portion and a drive portion configured by said coils and said magnets.

6. The lens driving apparatus of claim 1, wherein attached to an end face of said moving body on the subject side is a magnetic member, and said magnetic member is annular.

7. The lens driving apparatus of claim 1, wherein said cover portion is positioned in the optical axis direction by using said ceiling portion and positioned in the direction orthogonal to the optical axis direction by using said back yoke portion.

* * * * *